United States Patent
Ando et al.

(10) Patent No.: US 12,266,770 B2
(45) Date of Patent: Apr. 1, 2025

(54) SYSTEM FOR AND METHOD OF PROCESSING WASTE LITHIUM-ION BATTERY

(71) Applicant: KAWASAKI JUKOGYO KABUSHIKI KAISHA, Kobe (JP)

(72) Inventors: Fuminori Ando, Kobe (JP); Hiroaki Osawa, Kobe (JP); Chie Nakajima, Kobe (JP); Mariko Yamashita, Kobe (JP); Masahiro Sugata, Kobe (JP); Koji Fukumoto, Kobe (JP); Masaki Tsuzawa, Kobe (JP); Ryosuke Nagai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 756 days.

(21) Appl. No.: 17/436,908

(22) PCT Filed: Feb. 28, 2020

(86) PCT No.: PCT/JP2020/008402
§ 371 (c)(1),
(2) Date: Sep. 7, 2021

(87) PCT Pub. No.: WO2020/179692
PCT Pub. Date: Sep. 10, 2020

(65) Prior Publication Data
US 2022/0140412 A1    May 5, 2022

(30) Foreign Application Priority Data

Mar. 4, 2019 (JP) .................................. 2019-038149
Jun. 6, 2019 (JP) .................................. 2019-105991

(51) Int. Cl.
*H01M 10/54* (2006.01)
*B09B 3/35* (2022.01)
(Continued)

(52) U.S. Cl.
CPC ............... *H01M 10/54* (2013.01); *B09B 3/35* (2022.01); *B09B 3/40* (2022.01); *B09B 3/70* (2022.01);
(Continued)

(58) Field of Classification Search
CPC ..... H01M 10/54; H01M 10/0525; B09B 3/35; B09B 3/40; B09B 3/70; B09B 3/00;
(Continued)

(56) References Cited

U.S. PATENT DOCUMENTS 6,514,311 B1 * 2/2003 Lin ........................... C25C 1/12
205/582
11,145,915 B2 * 10/2021 Usui ....................... C22B 1/005
(Continued)

FOREIGN PATENT DOCUMENTS

CN         103270644 A      8/2013
CN         105811041    *   7/2016    ............ H01M 10/54
(Continued)

OTHER PUBLICATIONS

JP2018197385, Akira et al, Phosphorus Removing Method and Valuable Metal Recovering Method, Dec. 13, 2018 (Year: 2018).*
(Continued)

*Primary Examiner* — Jessee R Roe
*Assistant Examiner* — Michael Aboagye
(74) *Attorney, Agent, or Firm* — Oliff PLC (57) ABSTRACT

A system for and a method of processing a waste lithium-ion battery make it possible to improve heat treatment efficiency and to heat-treat a large-sized waste lithium-ion battery without disassembling the battery. One example of the system for processing a waste lithium-ion battery includes a heater that heat-treats a waste lithium-ion battery at a
(Continued)

heating temperature of lower than 400° C. to decompose and remove an electrolyte solution from the waste lithium-ion battery.

6 Claims, 2 Drawing Sheets (51) Int. Cl.
- B09B 3/40 (2022.01)
- B09B 3/70 (2022.01)
- C21D 9/67 (2006.01)
- C22B 7/00 (2006.01)
- C22B 26/12 (2006.01)
- H01M 10/0525 (2010.01)
- H01M 10/615 (2014.01)

(52) U.S. Cl.
CPC ............... *C21D 9/67* (2013.01); *C22B 7/001* (2013.01); *C22B 7/005* (2013.01); *C22B 26/12* (2013.01)

(58) Field of Classification Search
CPC .. B09B 5/00; C21D 9/67; C22B 7/001; C22B 7/005; C22B 26/12; Y02E 60/10; Y02P 10/20; Y02W 30/84
USPC ............ 266/205; 241/24, 24.1, 24.11, 24.12, 241/24.13, 24.14, 24.15
See application file for complete search history.

(56) References Cited

U.S. PATENT DOCUMENTS

| | | | |
|---|---|---|---|
| 2002/0124691 A1* | 9/2002 | Tateiwa | C22B 7/005 266/137 |
| 2005/0241943 A1 | 11/2005 | Kakuta et al. | |
| 2013/0287621 A1 | 10/2013 | Fujita et al. | |
| 2014/0017621 A1 | 1/2014 | Iida et al. | |
| 2014/0161696 A1* | 6/2014 | Stallmann | C04B 7/367 423/220 |

FOREIGN PATENT DOCUMENTS

| | | | | |
|---|---|---|---|---|
| CN | 106025422 | * | 9/2018 | ............ H01M 10/54 |
| CN | 108550942 | A | 9/2018 | |
| JP | H10-255861 | A | 9/1998 | |
| JP | 2005-011698 | A | 1/2005 | |
| JP | 2012-204000 | A | 10/2012 | |
| JP | 2012-229481 | A | 11/2012 | |
| JP | 2013-109841 | A | 6/2013 | |
| JP | 2016-022395 | A | 2/2016 | |
| JP | 2018-172727 | A | 11/2018 | |
| JP | 2018-197385 | A | 12/2018 | |
| JP | 2018197385 | * | 12/2018 | ............ H01M 10/54 |

OTHER PUBLICATIONS

CN105811041, Xiong-WEi et al., A Recovery Processing System Waste Lithium Ion Power Battery, Sep. 18, 2018 (Year: 2018).*
CN106025422, Chong, A Waste Lithium Ion Battery Pole Piece Recycling Device, Sep. 18, 2018 (Year: 2018).*

* cited by examiner

SYSTEM FOR AND METHOD OF PROCESSING WASTE LITHIUM-ION BATTERY

CROSS-REFERENCE TO RELATED APPLICATIONS

This is a National Phase of International Application No. PCT/JP2020/008402 filed Feb. 28, 2020, which claims the benefit of Japanese Applications No. 2019-038149 filed Mar. 4, 2019 and No. 2019-105991 filed Jun. 6, 2019. The disclosure of the prior applications is hereby incorporated by reference herein in its entirety.

TECHNICAL FIELD

The present invention relates to a system for and a method of processing a waste lithium-ion battery.

BACKGROUND ART

Lithium-ion batteries (LIB) are widely used in electric automobiles, mobile phones, laptop computers, etc. A lithium-ion battery includes, for example, a cathode material, an anode material, an electrolyte solution, and a separator. The cathode material is formed in such a manner that a cathode active material, such as lithium cobalt oxide, lithium nickel oxide, or lithium manganese oxide, is fixed to an aluminum foil by a fluorine-based binder. The anode material is formed in such a manner that an anode active material, such as graphite, is fixed to a copper foil by a fluorine-based binder.

In order to recover useful metals such as cobalt, nickel, manganese, and lithium from lithium-ion batteries to be discarded (waste lithium-ion batteries), such as spent lithium-ion batteries, heat treatment is performed thereon for the purpose of detoxifying (decomposing and removing) the electrolyte solution and reducing the volume of combustibles, such as the separator and the binder.

In the case of large-sized waste lithium-ion batteries that have been used in electric automobiles or the like, battery cells combined together form a battery module, and battery modules combined together form a battery unit.

Usually, such large-sized waste lithium-ion batteries are disassembled manually. Then, the disassembled components are subjected to, for example, roasting (heating) and sorting processes to recover useful metals therefrom. In such a case, a lot of time and labor are consumed to disassemble the large-sized waste lithium-ion batteries. Also, since a waste lithium-ion battery contains an electrolyte solution having a low flash point, if a short circuit occurs, it may cause ignition/explosion.

Patent Literature 1 discloses a configuration including a circular heat treatment furnace provided with a single furnace door. In Patent Literature 1, heat-resistant containers, each of which stores therein a battery module or a battery unit (battery pack) made up of multiple lithium-ion batteries, are sequentially fed into the heat treatment furnace by opening and closing the furnace door. The temperature of the heat treatment furnace is set to a constant temperature. In the heat treatment furnace, the heat-resistant containers are subjected to heat treatment. Then, the heat-resistant containers are sequentially discharged from the heat treatment furnace by opening and closing the furnace door.

CITATION LIST

Patent Literature

PTL 1: Japanese Laid-Open Patent Application Publication No. 2016-22395

SUMMARY OF INVENTION

Technical Problem

In the configuration of Patent Literature 1, a large-sized waste lithium-ion battery that is made up of a battery module or a battery unit can be heat-treated. However, since each heat-resistant container is fed into and discharged from the heat treatment furnace through the single furnace door, there is room for improvement in terms of heat treatment efficiency.

The present invention has been made to solve the above-described problems, and an object of the present invention is to provide a system for and a method of processing a waste lithium-ion battery, the system and the method making it possible to improve heat treatment efficiency and to heat-treat a large-sized waste lithium-ion battery without disassembling the battery.

Solution to Problem

In order to achieve the above object, a system for processing a waste lithium-ion battery according to one aspect of the present invention includes a heater that heat-treats a waste lithium-ion battery at a heating temperature of lower than 400° C. to decompose and remove an electrolyte solution from the waste lithium-ion battery.

According to the above configuration, by heat-treating the waste lithium-ion battery at a heating temperature of lower than 400° C. by the heater, the electrolyte solution can be decomposed and removed, and thereby the electrolyte solution can be detoxified. Here, by using low-oxygen gas such as combustion gas (having an oxygen concentration of 10% or lower, preferably 5% or lower) as heating gas, ignition/explosion of the electrolyte solution and the like can be prevented, and the size of the heater can be readily increased. Therefore, heat treatment efficiency can be improved, and a large-sized waste lithium-ion battery can be heat-treated without disassembling the battery.

The heating temperature, at which the heater heat-treats the waste lithium-ion battery, may be higher than or equal to 150° C. and lower than or equal to 250° C.

The heater may be a grate preheater that heat-treats the waste lithium-ion battery while transporting the waste lithium-ion battery in one direction.

In a case where the heater is the grate preheater, the waste lithium-ion battery can be continuously heat-treated while being transported. This makes it possible to improve heat treatment efficiency.

The system for processing a waste lithium-ion battery may further include a crusher that crushes the waste lithium-ion battery that has been heat-treated by the heater.

According to the above configuration, the waste lithium-ion battery is crushed by the crusher after the electrolyte solution is decomposed and removed (detoxified) from the waste lithium-ion battery. In this manner, the crushing can be performed safely, and also, heat exchangeability at a subsequent roaster is improved. Consequently, the heat treatment time can be reduced.

The system for processing a waste lithium-ion battery may further include a roaster that heat-treats the waste lithium-ion battery that has been crushed by the crusher at a heating temperature that is higher than or equal to 400° C. and lower than 660° C. in a reducing atmosphere or a low-oxygen atmosphere.

According to the above configuration, the waste lithium-ion battery that has been crushed into smaller pieces is heat-treated at a temperature (higher than or equal to 400° C. and lower than 660° C.) at which organic matter such as a separator and a binder are decomposed, but aluminum used in a cathode material does not melt. In this manner, heat exchangeability is improved, and thereby the heat treatment time can be reduced. In addition, the size of the roaster can also be reduced.

The roaster may include a cylindrical body whose internal atmosphere is a reducing atmosphere or a low-oxygen atmosphere, an outer wall of the cylindrical body being to be heated. The roaster may be an external heat type rotary kiln that: receives the waste lithium-ion battery through a receiving inlet positioned at one end of the cylindrical body; transports the waste lithium-ion battery inside the cylindrical body toward a discharging outlet positioned at another end of the cylindrical body by rotating the cylindrical body; and discharges the waste lithium-ion battery through the discharging outlet.

In a case where the roaster is the external heat type rotary kiln, the processes of receiving and discharging the waste lithium-ion battery into and from the roaster can be performed continuously. This makes it possible to improve heat treatment efficiency.

The above-described system for processing a waste lithium-ion battery may further include: a crusher that crushes the waste lithium-ion battery that has been heat-treated by the heater; a classifier that sorts out a cathode active material by separating the cathode active material from a cathode current collector of the waste lithium-ion battery that has been crushed by the crusher; and a roaster that heat-treats the cathode active material that has been sorted out by the classifier at a heating temperature of higher than or equal to 500° C. in a reducing atmosphere or a low-oxygen atmosphere.

According to the above configuration, the waste lithium-ion battery that has been heat-treated by the heater is crushed by the crusher into fine pieces, from which the cathode active material is sorted out by the classifier, and the cathode active material thus sorted out is heat-treated by the roaster. This makes it possible to further reduce the size of the roaster. Also, heat consumption can be reduced, because an exterior case, current collector, etc., are not heated unnecessarily. The aluminum current collector, which melts when the temperature is raised, is removed from the battery before the roasting is performed. Therefore, it is not necessary to set the upper limit roasting temperature.

The above-described system for processing a waste lithium-ion battery may further include: a crusher-classifier that sorts out a cathode active material by separating the cathode active material from a cathode current collector of the waste lithium-ion battery that has been heat-treated by the heater, while crushing the waste lithium-ion battery; and a roaster that heat-treats the cathode active material that has been sorted out by the crusher-classifier at a heating temperature of higher than or equal to 500° C. in a reducing atmosphere or a low-oxygen atmosphere.

According to the above configuration, while the waste lithium-ion battery that has been heat-treated by the heater is being crushed by the crusher-classifier into fine pieces, the cathode active material is sorted out, and the cathode active material thus sorted out is heat-treated by the roaster. This makes it possible to further reduce the size of the roaster. Also, heat consumption can be reduced, because an exterior case, current collector, etc., are not heated unnecessarily. The aluminum current collector, which melts when the temperature is raised, is removed from the battery before the roasting is performed. Therefore, it is not necessary to set the upper limit roasting temperature.

The roaster may: heat-treat the cathode active material in the reducing atmosphere in a case where the waste lithium-ion battery contains lithium, nickel, cobalt, and manganese in the cathode active material; and heat-treat the cathode active material in the low-oxygen atmosphere in a case where the waste lithium-ion battery contains lithium, iron, and phosphorus in the cathode active material.

Thus, the internal atmosphere of the roaster is set in accordance with the components contained in the cathode active material of the waste lithium-ion battery. This makes it possible to improve the lithium recovery rate in a subsequent lithium recovery process.

A method of processing a waste lithium-ion battery according to one aspect of the present invention includes: a heating step of heat-treating a waste lithium-ion battery at a heating temperature of lower than 400° C. to decompose and remove an electrolyte solution from the waste lithium-ion battery; a crushing step of crushing the waste lithium-ion battery that has been heat-treated in the heating step; and a roasting step of heat-treating the waste lithium-ion battery that has been crushed in the crushing step at a heating temperature that is higher than or equal to 400° C. and lower than 660° C. in a reducing atmosphere or a low-oxygen atmosphere.

According to the above method, by heat-treating the waste lithium-ion battery at a heating temperature of lower than 400° C. in the heating step, the electrolyte solution can be decomposed and removed, and thereby the electrolyte solution can be detoxified. Here, by using low-oxygen gas such as combustion gas (having an oxygen concentration of 10% or lower, preferably 5% or lower) as heating gas, ignition/explosion of the electrolyte solution and the like can be prevented, and the size of a heater used in the heating step can be readily increased. Therefore, heat treatment efficiency can be improved, and a large-sized waste lithium-ion battery can be heat-treated without disassembling the battery. The waste lithium-ion battery is, after the electrolyte solution is decomposed and removed therefrom, crushed in the next crushing step. In this manner, the crushing can be performed safely. Subsequently, in the roasting step, since heat treatment is performed on the waste lithium-ion battery that has been crushed into smaller pieces, heat exchangeability is improved, and thereby the heat treatment time can be reduced.

A method of processing a waste lithium-ion battery according to one aspect of the present invention includes: a heating step of heat-treating a waste lithium-ion battery at a heating temperature of lower than 400° C. to decompose and remove an electrolyte solution from the waste lithium-ion battery; a crushing step of crushing the waste lithium-ion battery that has been heat-treated in the heating step; a classifying step of sorting out a cathode active material by separating the cathode active material from a cathode current collector of the waste lithium-ion battery that has been crushed in the crushing step; and a roasting step of heat-treating the cathode active material that has been sorted out in the classifying step at a heating temperature of higher than or equal to 500° C. in a reducing atmosphere or a low-oxygen atmosphere.

According to the above method, by heat-treating the waste lithium-ion battery at a heating temperature of lower than 400° C. in the heating step, the electrolyte solution can be decomposed and removed, and thereby the electrolyte solution can be detoxified. Here, by using low-oxygen gas such as combustion gas (having an oxygen concentration of 10% or lower, preferably 5% or lower) as heating gas, ignition/explosion of the electrolyte solution and the like can be prevented, and the size of a heater used in the heating step can be readily increased. Therefore, heat treatment efficiency can be improved, and a large-sized waste lithium-ion battery can be heat-treated without disassembling the battery. The waste lithium-ion battery that has been heat-treated in the heating step is crushed into fine pieces in the crushing step, and the cathode active material is sorted out from the crushed pieces in the classifying step. The cathode active material thus sorted out is heat-treated in the roasting step. This makes it possible to reduce the size of a roaster used in the roasting step. Also, heat consumption can be reduced, because an exterior case, current collector, etc., are not heated unnecessarily. The aluminum current collector, which melts when the temperature is raised, is removed from the battery before the roasting is performed. Therefore, it is not necessary to set the upper limit roasting temperature.

A method of processing a waste lithium-ion battery according to one aspect of the present invention includes: a heating step of heat-treating a waste lithium-ion battery at a heating temperature of lower than 400° C. to decompose and remove an electrolyte solution from the waste lithium-ion battery; a crushing and classifying step of sorting out a cathode active material by separating the cathode active material from a cathode current collector of the waste lithium-ion battery that has been heat-treated in the heating step, while crushing the waste lithium-ion battery; and a roasting step of heat-treating the cathode active material that has been sorted out in the crushing and classifying step at a heating temperature of higher than or equal to 500° C. in a reducing atmosphere or a low-oxygen atmosphere.

According to the above method, by heat-treating the waste lithium-ion battery at a heating temperature of lower than 400° C. in the heating step, the electrolyte solution can be decomposed and removed, and thereby the electrolyte solution can be detoxified. Here, by using low-oxygen gas such as combustion gas (having an oxygen concentration of 10% or lower, preferably 5% or lower) as heating gas, ignition/explosion of the electrolyte solution and the like can be prevented, and the size of a heater used in the heating step can be readily increased. Therefore, heat treatment efficiency can be improved, and a large-sized waste lithium-ion battery can be heat-treated without disassembling the battery. While the waste lithium-ion battery that has been heat-treated in the heating step is being crushed into fine pieces in the crushing and classifying step, the cathode active material is sorted out from the crushed pieces in the crushing and classifying step. The cathode active material thus sorted out is heat-treated in the roasting step. This makes it possible to reduce the size of a roaster used in the roasting step. Also, heat consumption can be reduced, because an exterior case, current collector, etc., are not heated unnecessarily. The aluminum current collector, which melts when the temperature is raised, is removed from the battery before the roasting is performed. Therefore, it is not necessary to set the upper limit roasting temperature.

Advantageous Effects of Invention

The present invention is configured as described above, and has an advantage of being able to provide a system for and a method of processing a waste lithium-ion battery, the system and the method making it possible to improve heat treatment efficiency and to heat-treat a large-sized waste lithium-ion battery without disassembling the battery.

DESCRIPTION OF EMBODIMENTS

Hereinafter, preferred embodiments of the present invention are described with reference to the drawings. The present invention is not limited to the embodiments described below.

Embodiment 1

Figure 1:
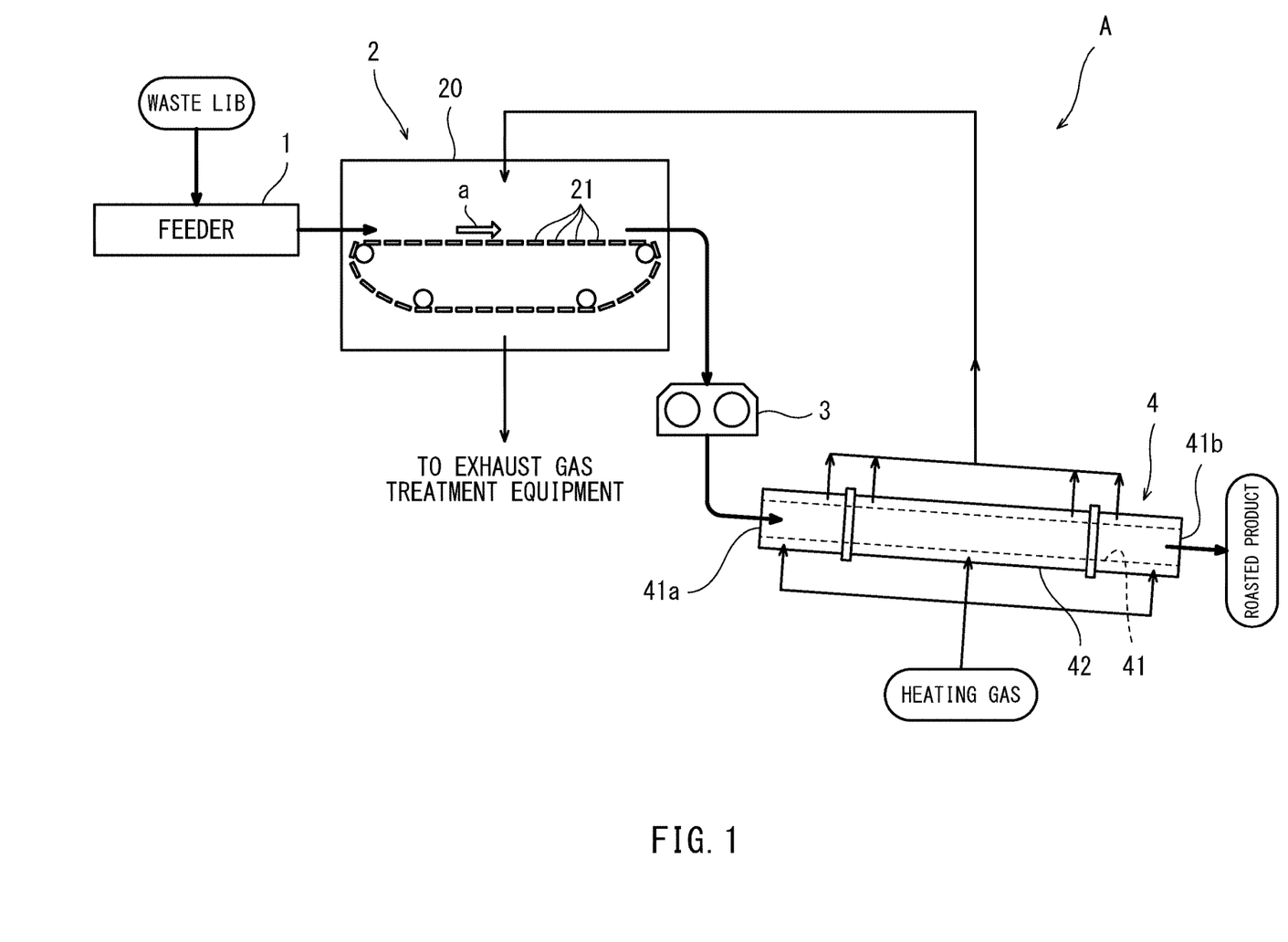
FIG. 1 is a schematic diagram schematically showing a system for processing a waste lithium-ion battery according to one example of Embodiment 1.

FIG. 1 is a schematic diagram schematically showing a system for processing a waste lithium-ion battery (hereinafter, "waste lithium-ion battery processing system") according to one example of Embodiment 1.

The waste lithium-ion battery processing system A is intended for processing a large-sized waste lithium-ion battery (a waste LIB), i.e., intended for processing a battery module in which battery cells of the waste lithium-ion battery are combined and for processing a battery unit in which such battery modules are combined. The battery unit is configured, for example, by accommodating electrically connected battery modules, a controller, and a cooling device in a casing. For example, the processing system A removes a waste lithium-ion battery from an electric automobile or a hybrid automobile, and processes the removed waste lithium-ion battery (the battery unit) as it is without disassembling the battery.

The processing system A includes a feeder 1, a heater 2, a crusher 3, and a roaster 4.

The feeder 1 is, for example, a transport conveyor. For example, when a worker sequentially places waste lithium-ion batteries to be processed on the transport conveyor (the feeder 1), the batteries are transported by the transport conveyor in one direction, and then from the position where the transporting ends, the batteries are sequentially fed to the heater 2.

In this example, the heater 2 is a known grate preheater. The grate preheater includes, inside a heater body (a casing) 20, a mechanism in which grate plates 21 made of heat-resistant cast steel and provided with a large number of slit-shaped holes are coupled together in a ring shape by an endless chain. By rotating the endless chain, the grate plates 21 are moved in a circulating manner. Accordingly, the heater 2 transports the waste lithium-ion batteries, which are fed from the feeder 1 and placed on the grate plates 21, in one direction (the direction indicated by an arrow a), and discharges the waste lithium-ion batteries from the position where the transporting ends. The heater 2 heats the transported waste lithium-ion batteries by utilizing heating gas that is supplied into the heater body 20 from the outside.

The crusher 3 is, for example, a roll crusher. The crusher 3 crushes each large-sized waste lithium-ion battery (battery unit or battery module) into pieces, each of which is roughly in the size of a battery cell.

The heater 2 and the crusher 3 are pre-processing equipment for the following roaster 4.

In this example, the roaster 4 is an external heat type rotary kiln. The external heat type rotary kiln includes a cylindrical body 41 and a heating jacket 42. The cylindrical body 41 rotates about its center axis. The heating jacket 42 surrounds the outer periphery of the cylindrical body 41. One end of the cylindrical body 41 is a receiving inlet 41a, and the other end is a discharging outlet 41b. The cylindrical body 41 is rotatably supported, and is inclined with a predetermined angle such that the cylindrical body 41 is sloped downward from the receiving inlet 41a toward the discharging outlet 41b. The cylindrical body 41 rotates about its center axis. Each waste lithium-ion battery fed from the crusher 3 to the receiving inlet 41a of the cylindrical body 41 is moved (transported) toward the discharging outlet 41b by the rotation of the cylindrical body 41. The internal atmosphere of the cylindrical body 41 is a reducing atmosphere or a low-oxygen atmosphere (having an oxygen concentration of 10% or lower). Heating gas is supplied to the heating jacket 42 surrounding the outer periphery of the cylindrical body 41. As a result, the outer wall of the cylindrical body 41 is heated, and the waste lithium-ion battery transported inside the cylindrical body 41 is heat-treated in the reducing atmosphere or the low-oxygen atmosphere. Then, the heat-treated waste lithium-ion battery is discharged through the discharging outlet 41b as a roasted product.

The heating jacket 42 is provided with a supply inlet and an exhaust outlet for the heating gas. For example, high-temperature (e.g., 550° C.) heating gas from a hot air generator is supplied to the heating jacket 42 through the supply inlet. The heating gas is discharged from the heating jacket 42 through the exhaust outlet, and is supplied to the heater 2. The heater body 20 of the heater 2 is provided with a supply inlet and an exhaust outlet for the heating gas. The heating gas discharged from the heating jacket 42 is cooled as necessary to a predetermined temperature (e.g., 200° C.), and then supplied into the heater 2 through the supply inlet thereof. Then, the gas discharged from the heater 2 through the exhaust outlet thereof is fed to and treated by exhaust gas treatment equipment. By thus using the exhaust gas discharged from the roaster 4 in the heater 2, energy saving is achieved.

Next, a flow of processing waste lithium-ion batteries by the processing system A is described. For example, a worker sequentially feeds large-sized waste lithium-ion batteries, each of which is made up of a battery unit or a battery module, to the feeder 1. The feeder 1 transports the waste lithium-ion batteries in one direction to feed the batteries to the heater 2.

The heater 2 heat-treats the waste lithium-ion batteries by the heating gas having a temperature of about 200° C. while transporting the batteries in one direction. In this manner, the electrolyte solution contained in each waste lithium-ion battery can be decomposed and removed, and the electrolyte solution can be detoxified. By performing the heat treatment by the heater 2 in a low-oxygen atmosphere (having an oxygen concentration of 10% or lower, preferably 5% or lower), ignition/explosion of the electrolyte solution can be prevented. Since an apparatus such as a grate preheater can be used as the heater 2, the size of the heater 2 can be readily increased.

Then, each waste lithium-ion battery whose electrolyte solution has been detoxified by the heater 2 is fed to the crusher 3, and is crushed by the crusher 3 into pieces, each of which is roughly in the size of a battery cell. Then, the crushed waste lithium-ion battery is fed to the roaster 4.

The waste lithium-ion battery fed to the receiving inlet 41a of the roaster 4 is heat-treated while being transported toward the discharging outlet 41b by the rotation of the cylindrical body 41, and thereby turns into a roasted product. The roasted product is discharged from the roaster 4 through the discharging outlet 41b. In order to readily recover useful metals such as cobalt in a subsequent process, the temperature of the roaster 4 needs to be such a temperature as to be able to decompose the organic matter, such as the separator and the binder (e.g., higher than or equal to 400° C.). However, the temperature of the roaster 4 needs to be a temperature at which aluminum used in the cathode material does not melt, i.e., a temperature lower than the melting point of aluminum (660° C.). Therefore, the heating temperature is preferably a temperature that is higher than or equal to 400° C. and lower than the melting point of aluminum (660° C.).

The roasted product discharged from the roaster 4 is further crushed into pieces. Then, the crushed pieces are subjected to, for example, a classifying process, and thereby useful metals such as copper, aluminum, cobalt, nickel, manganese, and lithium are extracted.

The waste lithium-ion battery processing system A of the present embodiment includes the heater 2, which heat-treats the waste lithium-ion battery at a heating temperature of lower than 400° C. to decompose and remove the electrolyte solution from the waste lithium-ion battery before the waste lithium-ion battery is heat-treated at a temperature of higher than or equal to 400° C. By heat-treating the waste lithium-ion battery at a heating temperature of lower than 400° C. by the heater 2, the electrolyte solution can be decomposed and removed, and thereby the electrolyte solution can be detoxified. Here, by using low-oxygen gas as the heating gas, ignition/explosion of the electrolyte solution and the like can be prevented, and also, since an apparatus such as a grate preheater can be used as the heater 2, the size of the heater 2 can be readily increased. Therefore, heat treatment efficiency can be improved, and a large-sized waste lithium-ion battery can be heat-treated without disassembling the battery.

In order to decompose and remove the electrolyte solution, the heating temperature of the heater 2 needs to be higher than or equal to 150° C. Therefore, the heating temperature of the heater 2 is preferably a temperature that is higher than or equal to 150° C. and lower than 400° C. Alternatively, the heating temperature of the heater 2 may be higher than or equal to 150° C. and lower than or equal to 250° C.

By using a grate preheater as the heater 2, the waste lithium-ion batteries can be continuously heat-treated while being transported. This makes it possible to improve heat treatment efficiency.

Each waste lithium-ion battery is crushed by the crusher 3 after the electrolyte solution is decomposed and removed (detoxified) from the waste lithium-ion battery by the heater 2. In this manner, the crushing can be performed safely.

Next, in the roaster 4, heat treatment is performed at a temperature that is higher than or equal to 400° C. and lower than 660° C. Since the heat treatment is performed on the waste lithium-ion battery that has been crushed by the crusher 3 into smaller pieces, heat exchangeability is improved, and thereby the heat treatment time can be reduced. In addition, the size of the roaster 4 can also be reduced.

Here, by using an external heat type rotary kiln as the roaster 4, the processes of receiving and discharging the waste lithium-ion batteries into and from the roaster 4 can be performed continuously. This makes it possible to improve heat treatment efficiency.

A method of processing a waste lithium-ion battery, the method being performed by the processing system A shown in FIG. 1, includes the steps of heating by the heater 2, crushing by the crusher 3, and roasting by the roaster 4.

Although the processing system A of Embodiment 1 has been described as a system for processing a battery module and a battery unit, the processing system A can also be a system for processing the battery cells of a waste lithium-ion battery.

Embodiment 2

Figure 2:
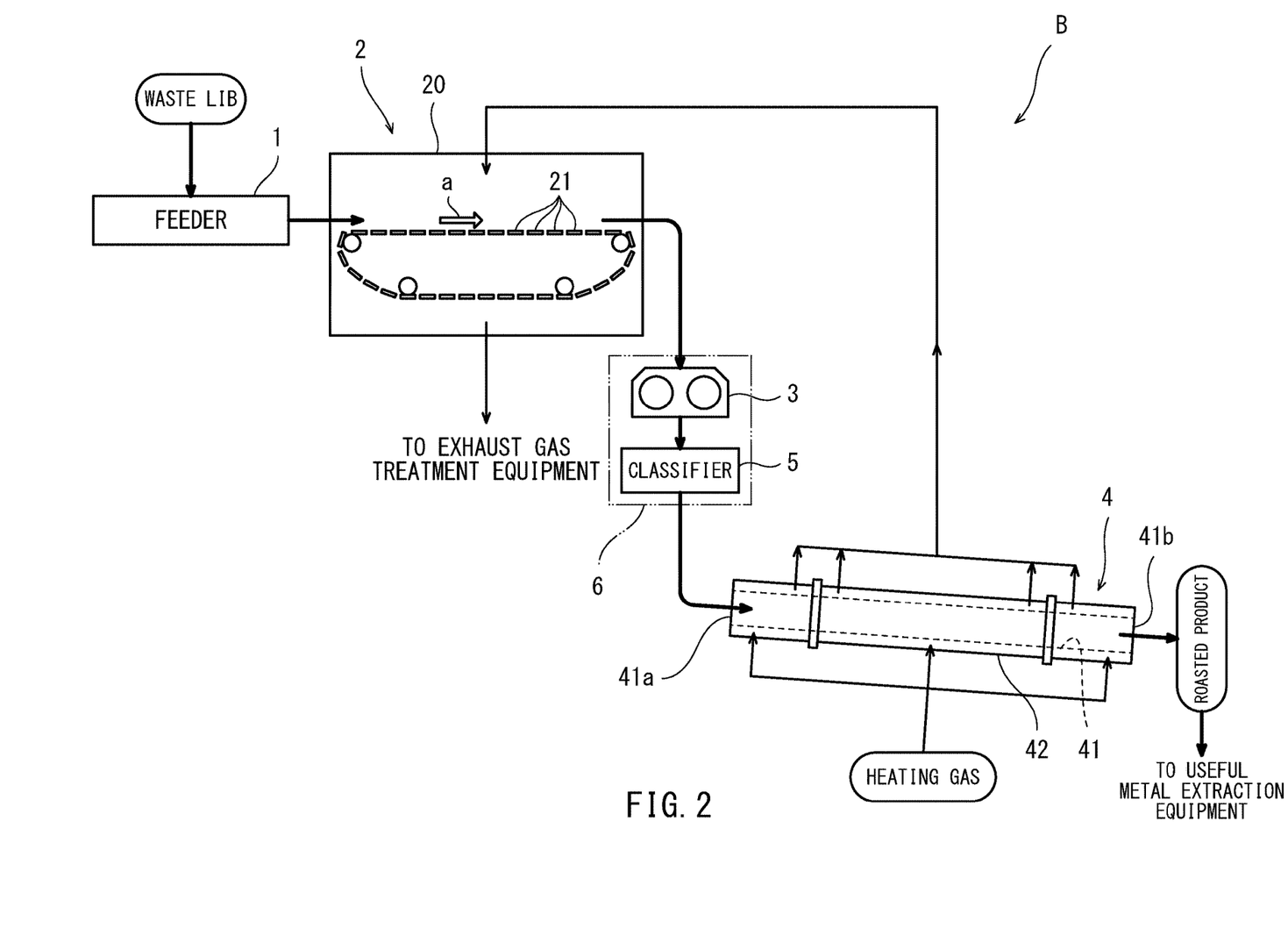
FIG. 2 is a schematic diagram schematically showing a system for processing a waste lithium-ion battery according to one example of Embodiment 2.

FIG. 2 is a schematic diagram schematically showing a system for processing a waste lithium-ion battery (hereinafter, "waste lithium-ion battery processing system") according to one example of Embodiment 2. In FIG. 2, the same elements as, or corresponding elements to, those shown in FIG. 1 are denoted by the same reference signs as those used in FIG. 1, and repeating the same descriptions is avoided below in some cases.

Embodiment 2 gives a description of a configuration in which a waste lithium-ion battery processing system B shown in FIG. 2 is used, and thereby, among the useful metals extracted from the roasted product, particularly the recovery rate of lithium contained in the cathode active material can be improved. A waste lithium-ion battery includes, for example, an exterior material serving as a battery case, a cathode material, an anode material, an electrolyte solution, and a separator. The cathode material is formed in such a manner that a cathode active material is fixed to a cathode current collector (e.g., an aluminum foil) by a binder. A lithium-containing oxide is used as the cathode active material. The anode material is formed in such a manner that an anode active material, such as graphite, is fixed to an anode current collector (e.g., a copper foil) by a binder. A resin such as PTFE or PVDF is used as the binder.

The processing system B shown in FIG. 2 includes the feeder 1, the heater 2, the crusher 3, a classifier 5, and the roaster 4. The feeder 1, the heater 2, the crusher 3, and the roaster 4 may be the same as those shown in FIG. 1. Similar to the case of FIG. 1, the crusher 3 may be, for example, a roll crusher. In the case of FIG. 1, the crusher 3 crushes the large-sized waste lithium-ion battery (battery unit or battery module) into pieces, each of which is roughly in the size of a battery cell. On the other hand, in the case of FIG. 2, the crusher 3 can crush the large-sized waste lithium-ion battery into pieces, each of which is in a size smaller than a battery cell.

The classifier 5 sorts and takes out the cathode active material by separating the cathode active material from the cathode current collector of the waste lithium-ion battery that has been crushed by the crusher 3. The classifier 5 is, for example, a sieve shaker containing alumina balls placed on a sieve. The alumina balls have a diameter of about 20 to 30 mm. The sieve has a suitable opening size (e.g., about several mm). By using the alumina balls, a large number of impact shocks are applied to part of the cathode material and the anode material by the alumina balls that are vibrating. In this manner, detachment (separation) of the active material from the cathode current collector and the anode current collector can be facilitated, and the cathode active material and the anode active material that are reduced in size can be caused to fall through the sieve. Therefore, in reality, the classifier 5 causes not only the cathode active material but also the anode active material and so forth (including a small amount of impurities other than the active materials) to fall through the sieve, and these materials thus taken out are fed to the roaster 4. Other than these taken-out materials, the exterior material, the current collectors, etc., of the waste lithium-ion battery are fed to different treatment equipment (not shown).

The feeding of the active materials and so forth from the classifier 5 to the roaster 4 can be performed via, for example, a rotary feeder. The feeding of the roasted product from the roaster 4 to useful metal extraction equipment can be performed via, for example, a double flap damper.

In the present embodiment, since the roaster 4 is mainly fed with the cathode active material and the anode active material, the size of the roaster 4 can be reduced. Moreover, since the roaster 4 is not fed with the current collectors (e.g., an aluminum foil), the heat treatment in the roaster 4 can be performed without taking into account the embrittlement of the current collectors.

Next, a flow of processing waste lithium-ion batteries by the processing system B is described. The processing system B can be intended not only for processing large-sized waste lithium-ion batteries, each of which is made up of a battery unit or a battery module, but also for processing battery cells. For example, a worker sequentially feeds waste lithium-ion batteries, each of which is made up of battery cells, a battery unit, or a battery module, to the feeder 1. The feeder 1 transports the waste lithium-ion batteries in one direction to feed the batteries to the heater 2.

The heater 2 heat-treats the waste lithium-ion batteries by the heating gas at a heating temperature that is higher than or equal to 150° C. and lower than 400° C. while transporting the batteries in one direction. In this manner, the electrolyte solution contained in each waste lithium-ion battery can be decomposed and removed, and the electrolyte solution can be detoxified. By performing the heat treatment by the heater 2 in a low-oxygen atmosphere (having an oxygen concentration of 10% or lower, preferably 5% or lower), ignition/explosion of the electrolyte solution can be prevented.

Then, each waste lithium-ion battery whose electrolyte solution has been detoxified by the heater 2 is fed to the crusher 3, and is crushed by the crusher 3 into pieces, each of which is in a size smaller than a battery cell. Then, the crushed waste lithium-ion battery is fed to the classifier 5. As previously described, the classifier 5 sorts out the cathode active material and the anode active material, and these cathode and anode active materials are fed to the roaster 4.

The cathode active material and the anode active material fed to the receiving inlet 41a of the roaster 4 are heat-treated while being transported toward the discharging outlet 41b by the rotation of the cylindrical body 41, and thereby turn into a roasted product. The roasted product is discharged from the roaster 4 through the discharging outlet 41b. In this example, the roaster 4 performs the heat treatment in a reducing atmosphere (e.g., having a CO concentration of 1%) or a low-oxygen atmosphere (e.g., having an $O_2$ concentration of 1 to 5%) at a heating temperature of higher than or equal to 500° C.

The roasted product discharged from the roaster 4 is fed to the useful metal extraction equipment, which extracts useful metals such as lithium. The useful metal extraction equipment extracts (recovers) useful metals such as lithium from the roasted product.

[Lithium Elution Test]

A testing apparatus simulating the processing system B was used to produce a roasted product, and a lithium elution test was performed on the roasted product to elute lithium therefrom.

The lithium elution test was performed on two types of lithium-ion batteries to be processed (one NCM battery and one LFP battery). Each type of battery was tested under varied roasting conditions (i.e., in different internal atmospheres of the roaster 4 at different heating temperatures). In the lithium elution test, a magnetic stirrer was used, in which the roasted product was immersed and stirred in a container of the magnetic stirrer containing water, and sulfuric acid was suitably added thereto for pH (hydrogen ion concentration) adjustment. In this manner, a lithium eluate was produced. Both in the case of the NCM battery and the case of the LFP battery, the heating in the heater 2 was performed by using low-oxygen gas (having an $O_2$ concentration of 5%) as atmospheric gas at a heating temperature of 250° C.

The NCM battery is a battery whose cathode active material contains lithium, nickel, cobalt, and manganese. The LFP battery is a battery whose cathode active material contains lithium, iron, and phosphorus. In both types of batteries, an aluminum foil is used as a cathode current collector; graphite is used as an anode active material; and a copper foil is used as an anode current collector.

[Results of Lithium Elution Tests]

In the case of the NCM battery, the lithium elution rate of the roasted product roasted at a heating temperature of 570° C. in a low-oxygen atmosphere (having an $O_2$ concentration of 1%) was 55%, while the lithium elution rate of the roasted product roasted at a heating temperature of 570° C. in a reducing atmosphere (having a CO concentration of 1%) was 85%.

Thus, a higher elution rate was obtained from the NCM battery not in the case where the battery was roasted in the low-oxygen atmosphere, but in the case where the battery was roasted in the reducing atmosphere. The same test was performed on the roasted product also at a heating temperature of 520° C. A higher elution rate was obtained at the higher heating temperature. The reason for this is considered that when the heating temperature is raised in the reducing atmosphere, the reaction between the cathode active material and CO progresses, and consequently, the cathode active material turns into a state where lithium is relatively easily soluble in water.

In the case of the LFP battery, the lithium elution rate of the roasted product roasted at a heating temperature of 570° C. in a low-oxygen atmosphere (having an $O_2$ concentration of 1%) was 28%, while the lithium elution rate of the roasted product roasted at a heating temperature of 570° C. in a reducing atmosphere (having a CO concentration of 1%) was 9%.

Thus, a higher elution rate was obtained from the LFP battery not in the case where the battery was roasted in the reducing atmosphere, but in the case where the battery was roasted in the low-oxygen atmosphere. The same test was performed on the roasted product also at a heating temperature of 520° C. A higher elution rate was obtained at the higher heating temperature. The reason for this is considered that when the heating temperature is raised in the low-oxygen atmosphere, the reaction between the cathode active material and oxygen progresses, and consequently, the cathode active material turns into a state where lithium is relatively easily soluble in water.

As described above, in the case of recovering lithium from the NCM battery, performing the roasting in the reducing atmosphere is more suitable, and in the case of recovering lithium from the LFP battery, performing the roasting in the low-oxygen atmosphere is more suitable. In both cases, the heating temperature is preferably higher than or equal to 500° C., and more preferably higher than or equal to 550° C.

In the case of the waste lithium-ion battery processing system B of the present embodiment, the advantageous effect obtained by including the heater 2, which heat-treats the waste lithium-ion battery at a temperature of lower than 400° C., is the same as in the case of the processing system A of Embodiment 1.

In the present embodiment, the waste lithium-ion battery that has been heat-treated by the heater 2 is crushed by the crusher 3 into fine pieces, from which the active materials are taken out by the classifier 5, and the active materials thus taken out are roasted by the roaster 4. This makes it possible to further reduce the size of the roaster 4 and reduce the heat consumption by the roaster 4. The aluminum current collector, which melts when the temperature is raised, is removed from the battery before the roasting is performed. Therefore, it is not necessary to set the upper limit roasting temperature.

In a case where the waste lithium-ion battery is a NCM battery, by roasting the battery in a reducing atmosphere by the roaster 4, the lithium recovery rate can be improved in a subsequent lithium recovery process. Also, in a case where the waste lithium-ion battery is a LFP battery, by roasting the battery in a low-oxygen atmosphere by the roaster 4, the lithium recovery rate can be improved in the subsequent lithium recovery process.

A method of processing a waste lithium-ion battery, the method being performed by the processing system B shown in FIG. 2, includes the steps of heating by the heater 2, crushing by the crusher 3, sorting by the classifier 5, and roasting by the roaster 4.

In the processing system B shown in FIG. 2, a crusher-classifier 6 may be used instead of the crusher 3 and the classifier 5. The crusher-classifier 6, while crushing the waste lithium-ion battery that has been heat-treated by the heater 2, sorts and takes out the cathode active material by separating the cathode active material from the cathode current collector of the waste lithium-ion battery. The crusher-classifier 6 may be an apparatus, for example, a crusher including a grate, such as an impact crusher or a shearing crusher. In reality, the crusher-classifier 6 takes out not only the cathode active material but also the anode active material and so forth, and these materials thus taken out are fed to the roaster 4. In this case, a method of processing a waste lithium-ion battery, the method being performed by the processing system B, includes the steps of heating by the heater 2, crushing and sorting by the crusher-classifier 6, and roasting by the roaster 4.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially modified without departing from the spirit of the present invention.

INDUSTRIAL APPLICABILITY

The present invention is useful, for example, as a system for and a method of processing a waste lithium-ion battery, the system and the method making it possible to improve heat treatment efficiency and to heat-treat a large-sized waste lithium-ion battery without disassembling the battery.

The invention claimed is:

1. A method of processing a waste lithium-ion battery, the method comprising: a heating step of heat-treating a waste lithium-ion battery at a heating temperature of higher than or equal to 150° C. and lower than or equal to 250° C. to decompose and remove an electrolyte solution from the waste lithium-ion battery without decomposing organic matter included in the waste lithium-ion battery;
a crushing and classifying step of using a crusher-classifier for sorting out a cathode active material by separating the cathode active material from a cathode current collector of the waste lithium-ion battery that has been heat-treated in the heating step, while crushing the waste lithium-ion battery; and a roasting step of heat-treating the waste lithium-ion battery that has been crushed in the crushing step at a heating temperature that is higher than or equal to 400° C. in a reducing atmosphere or a low-oxygen atmosphere, wherein in the heating step, the waste lithium-ion battery is heat-treated by using a grate preheater while the waste lithium-ion battery is being transported in one direction, in the crushing step, the waste lithium-ion battery is crushed by a crusher located at an outlet of the grate preheater, and the roasting step includes: receiving, through a receiving inlet of a rotary kiln, the waste lithium-ion battery that has been crushed by the crusher, the rotary kiln including a cylindrical body that rotates about a center axis of the cylindrical body and with an internal atmosphere that is the reducing atmosphere or the low-oxygen atmosphere, an outer wall of the cylindrical body being heated, the receiving inlet being at one end of the cylindrical body in a direction of the center axis of the cylindrical body; transporting, inside the cylindrical body toward a discharging outlet by rotating the cylindrical body, the waste lithium-ion battery that has been received through the receiving inlet, the discharging outlet being at another end of the cylindrical body in the direction of the center axis of the cylindrical body; and discharging the waste lithium-ion battery through the discharging outlet.

2. A system for processing a waste lithium-ion battery, the system comprising a heater that heat-treats a waste lithium-ion battery at a heating temperature of higher than or equal to 150° C. and lower than or equal to 250° C. to decompose and remove an electrolyte solution from the waste lithium-ion battery without decomposing organic matter included in the waste lithium-ion battery; a crusher that crushes the waste lithium-ion battery that has been heat-treated by the heater; and a roaster that heat-treats the waste lithium-ion battery that has been crushed by the crusher at a heating temperature that is higher than or equal to 400° C. in a reducing atmosphere or a low-oxygen atmosphere, wherein the heater is a grate preheater that heat-treats the waste lithium-ion battery while transporting the waste lithium-ion battery in one direction, the crusher is at an outlet of the grate preheater and is a crusher-classifier that sorts out a cathode active material by separating the cathode active material from a cathode current collector of the waste lithium-ion battery that has been heat-treated by the heater, while crushing the waste lithium-ion battery, the roaster is a rotary kiln including a cylindrical body that rotates about a center axis of the cylindrical body and with an internal atmosphere that is the reducing atmosphere or the low-oxygen atmosphere, an outer wall of the cylindrical body being heated, and the roaster: receives, through a receiving inlet of the rotary kiln, the waste lithium-ion battery that has been crushed by the crusher, the receiving inlet being at one end of the cylindrical body in a direction of the center axis of the cylindrical body; transports, inside the cylindrical body toward a discharging outlet by rotating the cylindrical body, the waste lithium-ion battery that has been received through the receiving inlet, the discharging outlet being at another end of the cylindrical body in the direction of the center axis of the cylindrical body; and discharges the waste lithium-ion battery through the discharging outlet.

3. The system for processing a waste lithium-ion battery according to claim 2, wherein the roaster heat-treats the waste lithium-ion battery that has been crushed by the crusher at a heating temperature that is higher than or equal to 400° C. and lower than 660° C.

4. The system for processing a waste lithium-ion battery according to claim 2, the system further comprising:
a classifier that sorts out a cathode active material by separating the cathode active material from a cathode current collector of the waste lithium-ion battery that has been crushed by the crusher; wherein
the roaster heat-treats the cathode active material that has been sorted out by the classifier at a heating temperature of higher than or equal to 500° C.

5. The system for processing a waste lithium-ion battery according to claim 2, wherein
the crusher is a crusher-classifier that sorts out a cathode active material by separating the cathode active material from a cathode current collector of the waste lithium-ion battery that has been heat-treated by the heater, while crushing the waste lithium-ion battery.

6. The system for processing a waste lithium-ion battery according to claim 4, wherein the roaster:
heat-treats the cathode active material in the reducing atmosphere in a case where the waste lithium-ion battery contains lithium, nickel, cobalt, and manganese in the cathode active material; and
heat-treats the cathode active material in the low-oxygen atmosphere in a case where the waste lithium-ion battery contains lithium, iron, and phosphorus in the cathode active material.

* * * * *